(12) United States Patent
Takahashi et al.

(10) Patent No.: US 8,137,654 B2
(45) Date of Patent: Mar. 20, 2012

(54) METHOD OF ROASTING MATERIAL CONTAINING AT LEAST ONE OF V, MO AND NI AND ROTARY KILN FOR ROASTING THE SAME

(75) Inventors: Kenji Takahashi, Toyama (JP); Hiroichi Sugimori, Toyama (JP); Nobuo Ehara, Tokyo (JP)

(73) Assignees: JFE Material Co., Ltd., Toyama (JP); Sumitomo Heavy Industries, Ltd., Tokyo (JP)

( * ) Notice: Subject to any disclaimer, the term of this patent is extended or adjusted under 35 U.S.C. 154(b) by 135 days.

(21) Appl. No.: 11/992,838

(22) PCT Filed: Feb. 21, 2006

(86) PCT No.: PCT/JP2006/303036
§ 371 (c)(1),
(2), (4) Date: Mar. 31, 2008

(87) PCT Pub. No.: WO2007/039938
PCT Pub. Date: Apr. 12, 2007

(65) Prior Publication Data
US 2009/0126531 A1    May 21, 2009

(30) Foreign Application Priority Data
Oct. 5, 2005    (JP) ................. 2005-292397

(51) Int. Cl.
| C01B 13/14 | (2006.01) |
| C01B 13/32 | (2006.01) |
| C22B 1/02 | (2006.01) |
| C22B 1/06 | (2006.01) |
| C22B 5/00 | (2006.01) |
| C22B 23/02 | (2006.01) |
| C22B 23/06 | (2006.01) |
| C22B 34/22 | (2006.01) |
| C22B 34/34 | (2006.01) |

(52) U.S. Cl. ......... 423/592.1; 423/53; 423/62; 423/138; 423/153; 423/154; 423/579; 423/606; 423/594.17; 423/594.19; 75/585; 75/622; 75/623; 75/626; 75/629

(58) Field of Classification Search ................. 432/103, 432/105, 109, 110, 116; 423/53, 62, 138, 423/153, 154, 579, 592.1, 606, 594.17, 594.19; 75/585, 622, 623, 628, 629
See application file for complete search history.

(56) References Cited

U.S. PATENT DOCUMENTS 3,615,344 A * 10/1971 Meunier et al. ................. 75/376
(Continued)

FOREIGN PATENT DOCUMENTS

JP    48-86703 A    11/1973
(Continued)

OTHER PUBLICATIONS

English translation of JP S54-097598, Aug 1, 1979.*
(Continued)

*Primary Examiner* — Jerry Lorengo
*Assistant Examiner* — Jared Wood
(74) *Attorney, Agent, or Firm* — Holtz Holtz Goodman & Chick, PC

(57) ABSTRACT

Provided is a roasting method capable of reducing both C and S components in minerals down to 0.5% or less, respectively, and securing a yield ratio of 90% or more for the Mo component. In a rotary kiln 7, a V, Mo and Ni containing material containing C and S components is subjected to oxidizing roasting to remove the C and S components from the material before reducing the material by means of a reducing agent in order to recover valuable metals composed of V, Mo and Ni. The rotary kiln is equipped with a burner 11 disposed on a material charge side 8a of the roasting furnace 8 to which the material is charged. In the roasting furnace, a direction along which the material moves and a flow of oxygen-containing gas introduced into the roasting furnace 8 are set to be parallel with each other.

16 Claims, 5 Drawing Sheets

U.S. PATENT DOCUMENTS

| | | | |
|---|---|---|---|
| 4,721,606 A | | 1/1988 | Tilley |
| 5,013,533 A | | 5/1991 | Howard et al. |
| 5,415,849 A | | 5/1995 | Toyabe |
| 2004/0213717 A1 | | 10/2004 | Akahoshi |

FOREIGN PATENT DOCUMENTS

| | | | | |
|---|---|---|---|---|
| JP | 54-097598 | | * | 8/1979 |
| JP | 54-97598 | A | | 8/1979 |
| JP | 54-107495 | A | | 8/1979 |
| JP | 54107495 | A | * | 8/1979 |
| JP | S54-097598 | | * | 8/1979 |
| JP | 58-3936 | A | | 1/1983 |
| JP | 11-1725 | A | | 1/1999 |
| JP | 11-50162 | A | | 2/1999 |
| JP | 2003-183745 | A | | 7/2003 |
| JP | 2004-285473 | A | | 10/2004 |
| JP | 2004285473 | A | * | 10/2004 |
| JP | 2005-256174 | A | | 9/2005 |
| JP | 2005-272917 | A | | 10/2005 |

OTHER PUBLICATIONS

English-language International Preliminary Report on Patentability for International Report on Patentability for International application PCT/JP2006/303036 filed Feb. 21, 2006; Applicants: JFE Material Co., Ltd. et al.

Supplemental European Search Report for EP 06714176 dated Jun. 15, 2010.

* cited by examiner

US 8,137,654 B2

METHOD OF ROASTING MATERIAL CONTAINING AT LEAST ONE OF V, MO AND NI AND ROTARY KILN FOR ROASTING THE SAME

CROSS-REFERENCE TO RELATED APPLICATION

This application is the United States national phase application of International Application PCT/JP2006/303936 filed Feb. 21, 2006.

TECHNICAL FIELD

The present invention relates to a method of roasting a material containing at least one of V (Vanadium), Mo (Molybdenum) and Ni (Nickel), which contains C (Carbon) and S (Sulfur) components, by oxidizing roasting to remove the C and S components therefrom before reducing the material with a reducing agent for recovery of a valuable metal of at least one of V, Mo and Ni.

TECHNICAL BACKGROUND

In boilers that use petroleum fuel as fuel like in electric power plants, boiler sludge is deposited on the bottom of a boiler and dust collectors catch boiler ash. In the boiler sludge and boiler ash, heavy metals such as Ni and V are condensed as oxides. In ammonium metavanadate which is obtained by performing wet alkali treatment with the boiler ash, a heavy metal of V is condensed as an oxide.

In the field of oil refinery, gas processing industry and others, desufurization catalyst is spent in the refinery process. Once spent in this process, the desufurization catalyst also contains, as oxides, heavy metals of Ni, Mo, and V in the form of condensation. It is desired to recover these oxides, which are Ni, Mo and V, in the form of metal, which promotes more effective use of waste materials.

As one of techniques for recovering valuable metals from those V, Mo and Ni containing materials, the inventors have proposed a method of recovering a valuable metal, the method including a roasting step of roasting a V, Mo and Ni containing material; a step of charging a heating furnace with the V, Mo and Ni containing material, a reducing agent and flux and heating them for reduction thereby to produce a V-containing slag and a Fe—Mo—Ni base alloy; and a step of charging a reducing agent for the V-containing slag to produce an Fe—V base alloy and a CaO—$Al_2O_3$ slag (see Patent document 1, claim 1).

In this valuable metal recovering method disclosed in the patent document 1, the C and S components in the V, Mo and Ni containing material are first removed as oxides in the roasting step, and then the reducing agent is used to reduce the V, Mo and Ni containing material to produce a Fe—Mo—Ni base alloy. This reduction is followed by desulfurization and decarbonization of the Fe—Mo—Ni base alloy. The desulfurization and decarbonization are in compliance with the standards, applied in the field of steel handling Fe—Mo—Ni base alloy, which requires the sulfur component to be lowered.

Patent document 1: Japanese Patent Laid-open (unexamined) Publication No. 2004-285473

DISCLOSURE OF THE INVENTION

Problems to be Solved by the Invention

However, the step for the desulfurization and decarbonization of the Fe—Mo—Ni base alloy becomes complicated, because this step is carried out after a further step of supplying the Fe—Mo—Ni base alloy to the heating furnace and adding lime, CaO—$Al_2O_3$ base flux and CaO—$Al_2O_3$—FeO base flux to stir them together. In addition, the desulfurization/decarbonization step involves a process to dispose of a desulfurizing material. These drawbacks result in an increase in recovery cost, thus making it difficult to realize recycling business. Moreover, the desulfurization and decarbonization of the Fe—Mo—Ni base alloy have limitations in their performances, which sometimes prevents the alloy from meeting the standards due to amounts of carbon and sulfur components contained in the Fe—Mo—Ni base alloy.

Hence, in realizing the process for reducing V, Mo and Ni containing material with the use of reducing agents in order to recover the valuable metals, it is significant that S and C components are removed, as much as possible, from the V, Mo and Ni containing material in the roasting step preceding the reduction step. Furthermore, the sublimation of the Mo content in the roasting process results in a decrease in recovery rate of the Mo content. Accordingly, it is necessary to take notice of the sublimation of the Mo content.

The present invention has been made in view of the foregoing conventional problems, and it is an object to provide a roasting method and a rotary kiln which are able to reduce both C and S components in minerals down to 0.5% or less, respectively, and secure a yield ratio of 90% or more for the Mo component.

Means for Solving the Problems

In order to resolve the foregoing problems, the inventors carried out experiments with a variety of types of rotary kilns. The results of the experiments made the inventors notice the order of the decarbonization and desulfurization generated within the roasting furnace. In other words, the fact is that the desulfurization will follow the decarbonization, i.e., on the contrary, there is little possibility that the desulfurization is generated so long as the decarbonization is generated (because the desulfurization is a reaction which is generated in an oxide atmosphere and whenever there remains a C component, oxygen is used for the decarbonization). The inventors' founding is that, when a material roasted is first subjected to oxidization of the C component in a material-charge-side zone in a roasting furnace and then to oxidization of the S component in a zone ranging from a central zone to a material discharge side in the roasting furnace, a reaction time for making the S component oxidized can be prolonged, which ultimately leads to a large reduction in both the C and S components of the mineral roasted.

Practically, as one aspect, the present invention provides a method of roasting a material containing at least one of V, Mo and Ni by oxidizing roasting in a rotary kiln to remove C and S components from the material, before reducing the material by means of a reducing agent so as to recover a valuable metal composed of at least one of V, Mo and Ni, the method comprising steps of: charging the material containing the C and S components into a material charge side of a roasting furnace on which a burner is disposed; and taking an oxygen-containing gas taken into the roasting furnace to become parallel to a direction along which the material moves in the roasting furnace.

As another aspect, the present invention provides a rotary kiln for roasting a material containing at least one of V, Mo and Ni by oxidizing roasting to remove C and S components from the material, before reducing the material by means of a reducing agent so as to recover a valuable metal composed of at least one of V, Mo and Ni, the rotary kiln comprising: a roasting furnace into which the material containing the C and S components is charged as a material to be processed; a burner disposed on a material charge side of the roasting furnace; and a line introducing an oxygen-containing gas into the roasting furnace, and wherein a direction along which the material moves in the roasting furnace and a flow of the oxygen-containing gas taken into the roasting furnace are set to be parallel with each other.

Effects of the Invention

According to the inventions of claims 1 and 10, as the material-charge-side zone in the roasting furnace is already in a high temperature atmosphere when a material to be roasted is charged into the furnace, the C component is first oxidized in the material-charge-side zone in the roasting furnace, and then the S component is oxidized in the zone ranging from the central zone to the material discharge side in the roasting furnace. The reaction time for oxidizing the S component can therefore be made longer, whereby both the C and S components in the mineral roasted can be reduced largely.

DESCRIPTION OF REFERENCE NUMERALS

Figure 1:
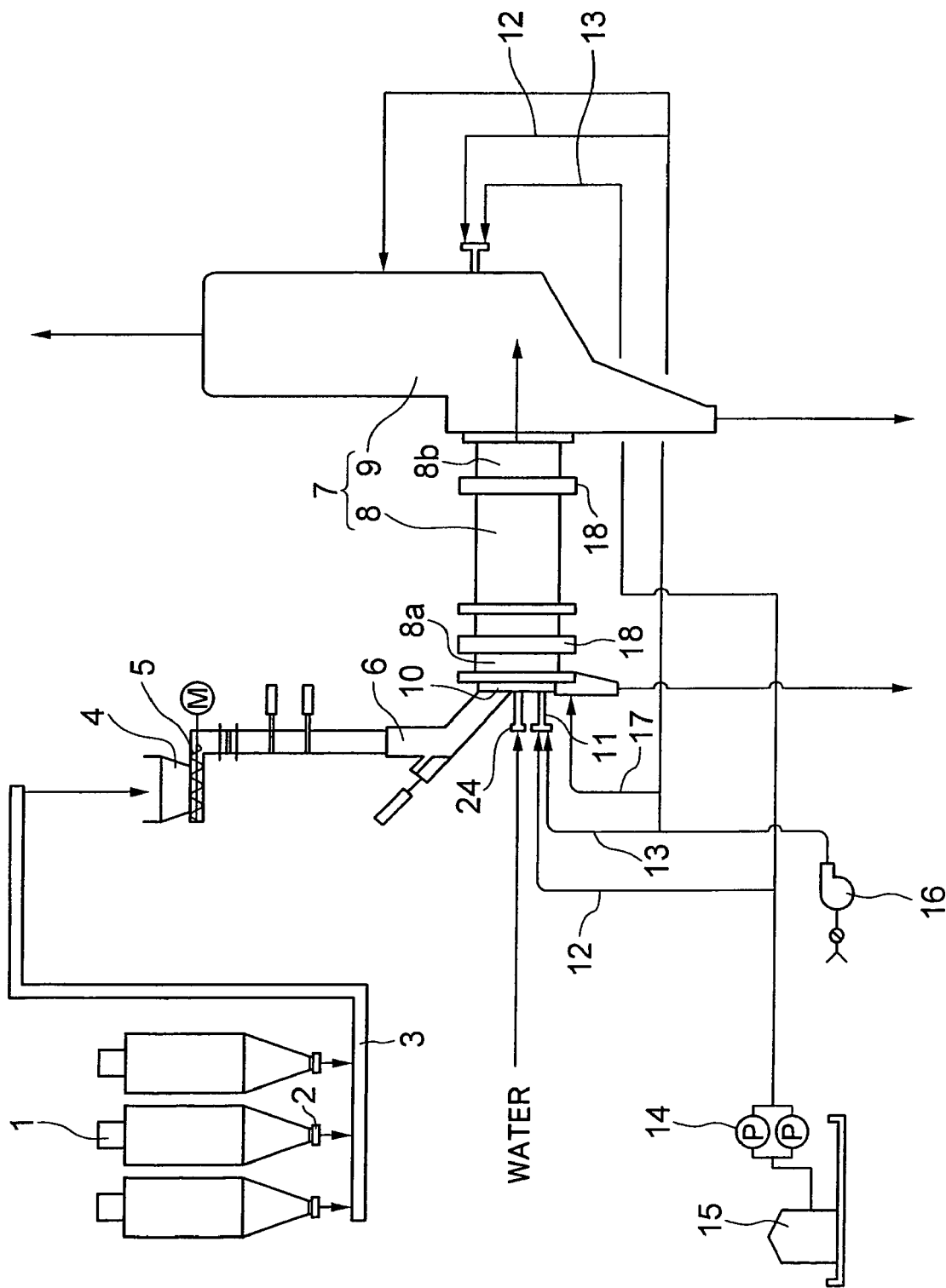
FIG. 1 is a system diagram illustratively showing the overall configuration of an operation facility in which the roasting method of V, Mo and Ni containing materials according to the present invention is reduced into practice.

1 . . . hopper
2 . . . volumetric feeder
3 . . . carrying conveyer
4 . . . material-accepting hopper
5 . . . material stirring feeder
6 . . . mineral-supplying chute
7 . . . rotary kiln
8 . . . roasting furnace
8a . . . material charge side
8b . . . material discharge side
9 . . . secondary combustion chamber
10 . . . front wall
11 . . . burner
22 . . . short-flame burner
21 . . . long-flame burner
23 . . . counter burner
24 . . . cooling water nozzle
25, 26 . . . material discharge outlet

BEST MODE FOR CARRYING OUT THE INVENTION

An embodiment according to the present invention, which relates to how to roast a V, Mo and Ni containing material, will now be described. In the present embodiment, the V, Mo and Ni containing material is handled as a material to be roasted. To be specific, the material to be roasted contains at least one of spent desulfurization catalyst (direct desulfurization catalyst, indirect desulfurization catalyst), boiler ash, boiler sludge, nickel base alloy, ammonium metavanadate and others, or a mixture of any of them. Table 1 exemplifies the components of each material.

TABLE 1

| Product name | Volatile portions and others wt % | [Estimated average description of materials to be charged: Dry, wt %] | | | | | | | | | | | |
|---|---|---|---|---|---|---|---|---|---|---|---|---|---|
| | | Ni | Mo | V | P | S | C | Fe | Al | SiO2 | Co | Ti | W |
| Used direct desulfurization catalyst | 26.0% | 3.81% | 5.39% | 7.30% | 0.80% | 10.00% | 23.00% | 3.00% | 25.00% | 0.80% | 0.00% | 0.00% | 0.00% |
| Used indirect desulfurization catalyst and others | 11.0% | 1.20% | 12.09% | 0.64% | 0.50% | 1.00% | 23.00% | 3.00% | 25.00% | 0.00% | 1.52% | 0.00% | 0.00% |
| Petroleum coke boiler ash | 11.0% | 0.50% | 0.00% | 1.50% | 0.00% | 6.50% | 80.00% | 0.50% | 0.20% | 2.00% | 0.00% | 0.00% | 0.00% |
| Sootman carbon | 50.0% | 1.50% | 0.00% | 2.00% | 0.00% | 0.13% | 68.00% | 2.00% | 0.04% | 0.10% | 0.00% | 0.00% | 0.00% |
| Nickel component | 55.0% | 8.50% | 0.00% | 3.50% | 0.02% | 0.00% | 0.00% | 0.10% | 0.01% | 0.03% | 0.00% | 0.00% | 0.00% |
| Ammonium metavanadate | 0.0% | 0.00% | 0.00% | 43.00% | 0.00% | 0.00% | 0.00% | 0.00% | 0.00% | 0.00% | 0.00% | 0.00% | 0.00% |
| IGCC sludge | 75.0% | 0.90% | 0.00% | 3.30% | 0.00% | 0.00% | 0.00% | 7.64% | 1.50% | 0.60% | 0.00% | 0.00% | 0.00% |
| VR boiler ash | 50.0% | 0.75% | 0.00% | 0.75% | 0.00% | 3.50% | 88.00% | 1.00% | 1.00% | 5.00% | 0.00% | 0.00% | 0.00% |

As shown in Table 1, the desulfurization catalyst contains large proportions of C and S components as well as large proportions of Ni, Mo and V components. In the boiler ash, by way of example, some 80 wt % of C component is contained, but no Mo component is contained. The carbon base sludge contains moisture, for example, by 50 wt %. As exemplified, waste materials with various types of components can be handled as a material to be roasted. Such materials are given with heavy fuel oil or moisture adhering thereto.

FIG. 1 is a system diagram illustratively showing the overall configuration of an operation facility for putting the roasting method of a V, Mo and Ni containing material into practice. Materials are persevered, type by type, in hoppers 1 for materials to be processed. At a lower part of each of the hoppers 1, there is equipped with a volumetric feeder 2 so that the feeder 2 feeds, on a volumetric basis, a predetermined amount of each material to the carrying conveyer 3. In each volumetric feeder 2, the components of each material are adjusted. The carrying conveyer 3 conveys the volumetric-fed material to a material-accepting hopper 4. This material-accepting hopper 4 is equipped, at its lower part, with a material stirring feeder 5 which is a screw conveyer. The material stirring feeder 5 operates to stir the material and supplies it to a mineral-supplying chute 6 in a dropping manner. The mineral-supplying chute 6 receives the dropped material and guides the received material to a roasting furnace 8 arranged in a rotary kiln 7.

The kiln includes a vertical type kiln, but in the present invention, a horizontal type rotary kiln is selected for the rotary kiln 7. The material is composed of a solid form material, mud form material, or powder form material, or a mixture of those materials. The mixture is in almost sludge.

The rotary kiln 7 is provided with the foregoing roasting furnace 8 for performing oxidizing roasting of a V, Mo and Ni containing material and a secondary combustion chamber 9 for secondarily burning exhaust gas. The roasting furnace 8 is produced in a cylindrical shape, on outer circumferential surface of which gears 18 are disposed. This roasting furnace 8 is configured to be driven by an electric motor which is not shown in the drawings. In addition, with the object of allowing the material to move from a material charge side 8a to a material discharge side 8b in the roasting furnace 8, the furnace 8 is paced to have a tilt so that the material discharge side 8b becomes lower than the material charge side 8a. Both the roasting furnace 8 and the secondary combustion chamber 9 are linked to each other so that the roasting furnace 8 is rotatable and the linkage therebetween is kept in an airtight manner. The exhaust gas discharged from an outlet of the roasting furnace 8 is guided to the secondary combustion chamber 9, where the guided exhaust gas rises up along the chamber 9. After being secondarily burned in the secondary combustion chamber 9, the exhaust gas is rendered harmless by familiarities including a waste heat recovery facility, exhaust gas cooling facility, exhaust gas processing facility and dust collecting facility and then discharged outside.

The mineral-supplying chute 6 is linked to a charging inlet which is formed in a front wall 10 which is an axially end face on the material charge side 8a of the roasting furnace 8. A burner 11 is arranged to pass through this front wall 10. Thus the burner 11 emits flame from the front wall 10 downstream in the roasting furnace 8. Coupled to the burner 11 are both a fuel supply line 12 and a combustion air line 13. Hence, a fuel pump 14, which intervenes between a fuel tank 15 and the line 12, operates to supply-fuel such as heavy fuel oil from the fuel tank 15 to the burner 11. Moreover, the burner 11 receives supply of combustion air from a blower 16 via the line 13.

The material charge side 8a of the roasting furnace 8 is linked with an air supply line 17 serving as a line for introducing a gas containing oxygen. Oxygen in the air, which is supplied from the air supply line 17, is used for oxidizing both C and S components. The air supply line 17 is branched from the combustion air line 13.

A material is charged into the roasting furnace 8 from the mineral-supplying chute 6. The charged material in the furnace 8 is immediately subject to heating under the burner 11. In the roasting furnace 8, the material is stirred, during which time the material is heated and gradually moved from the material charge side 8a to the material discharge side 8b. Since the material charge side 8a of the furnace is lined with the air supply line 17, a material moving direction and an air flow introduced into the furnace 8 are in parallel with each other. The rotary kiln based on such a gas flow is called "parallel-flow type rotary kiln."

Figure 2:
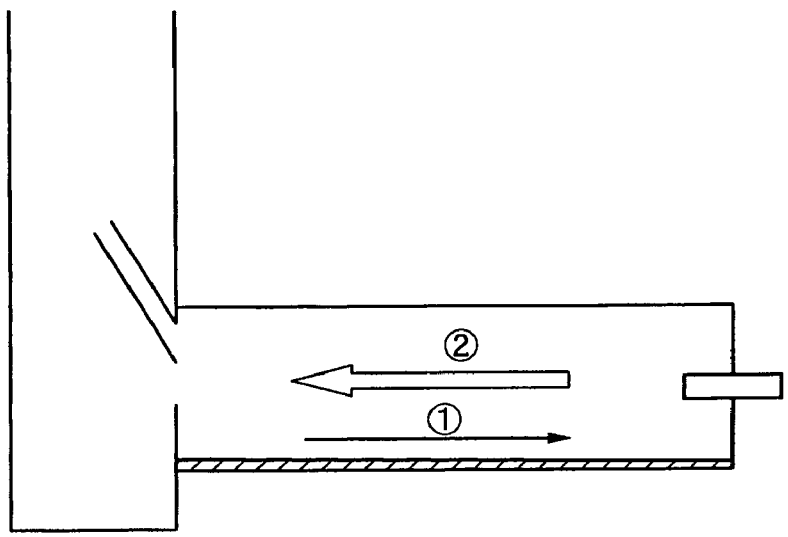
FIG. 2 is a diagram outlining a counter-flow type rotary kiln according to a comparative example.

By contrast, as shown in FIG. 2, a rotary kiln in which a material moving direction (1) and an air flow (2) introduced in the furnace are opposed to each other is called "counter-flow type rotary kiln."

Figure 3:
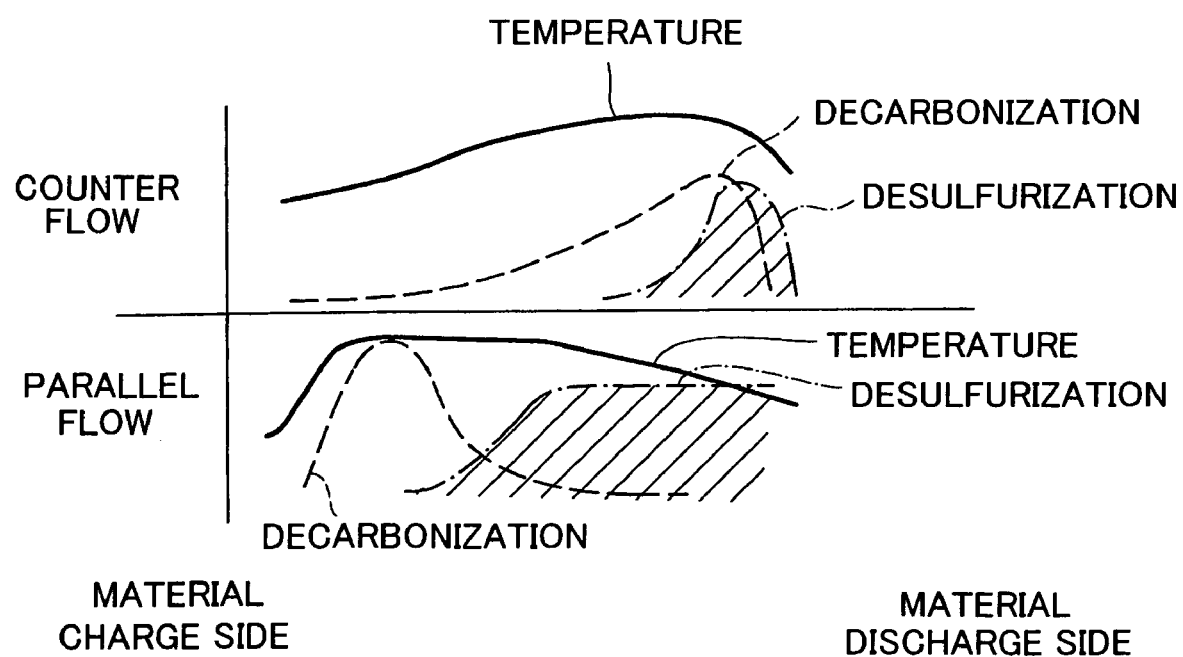
FIG. 3 is a graph showing a functional comparison between a parallel-flow type rotary kiln and a counter-flow type rotary kiln.

FIG. 3 is a graph showing comparisons between both the parallel-flow type rotary kiln and counter-flow type rotary kiln as to their in-furnace temperature distributions, desulfurization states, and decarbonization states. In the parallel-flow type rotary kiln, the in-furnace temperature becomes high in the zone on the material charge side 8a and gradually decreases with increasing proximity to the material discharge side 8b, because the burner 11 is located on the material charge side 8a of the roasting furnace 8. In contrast, the counter-flow type rotary kiln adopts a burner located on the material discharge side of a roasting furnace, with the result that the in-furnace temperature is lower in a zone on the material charge side and shows a gradual increase with increasing proximity to the material discharge side.

Within the roasting furnace 8, the material is devolatilized; specifically, the C and S components are removed from the material. In the case of taking account of only heat exchange in the material, the counter-flow type rotary kiln is superior in a heat exchange rate to the parallel-flow type rotary kiln. However, in the counter-flow type rotary kiln, as explained, the temperature profile in the roasting furnace is inclined such that temperatures in the zone on the material charge side 8a are lower and gradually increase with increasing proximity to the material discharge side 8b. As to in what order the reactions of the C and S components are generated, the C component is first removed, and then the removal of the S component follow. In order to allow the oxidization reaction to remove the S component, the S component should be exposed to an over-oxygen atmosphere. However, as long as there remains the C component in the material, the over-oxygen atmosphere cannot be created, thereby worsening in the efficiency of the oxidization reaction for the S component. In the counter-flow type rotary kiln, it is not until the material moves to the higher-temperature material discharge side zone that the C component is burned and removed. During an interval of time in which the material is moved to the material discharge side zone, the C component is not burned, so that the oxidization reaction of the S component will not be generated. The removal of the C component in the material discharge side zone is finally followed by the oxidization reaction which causes the S component to change into SOx. In other words, in the counter-flow type rotary kiln, the reaction to remove the S component is generated in the latter zone on the material discharge side 8b and the reaction time is shorter. Hence, only a small amount of the S component (refer to a shaded portion in FIG. 3) is desulfurized.

In contrast, in the parallel-flow type rotary kiln, upon entering the roasting furnace 8 the material enters its high-temperature and over-oxygen state. Accordingly, the combustion reaction of the C component is generated, from the beginning, on the material charge side 8a, which reduces the C component. Then, as the material moves along the central zone to the material discharge side 8b in the roasting furnace 8, the oxidization reaction of the S component is generated in the material with over-oxygen. That is, in the parallel-flow type rotary kiln, the material is subjected to the S-component removal reaction while the material moves in the zone ranging from the central zone to the material discharge side 8b, which makes the reaction time longer. Hence, as shown by a shaded portion in FIG. 3, a large amount of the S component can be removed.

Figure 4:
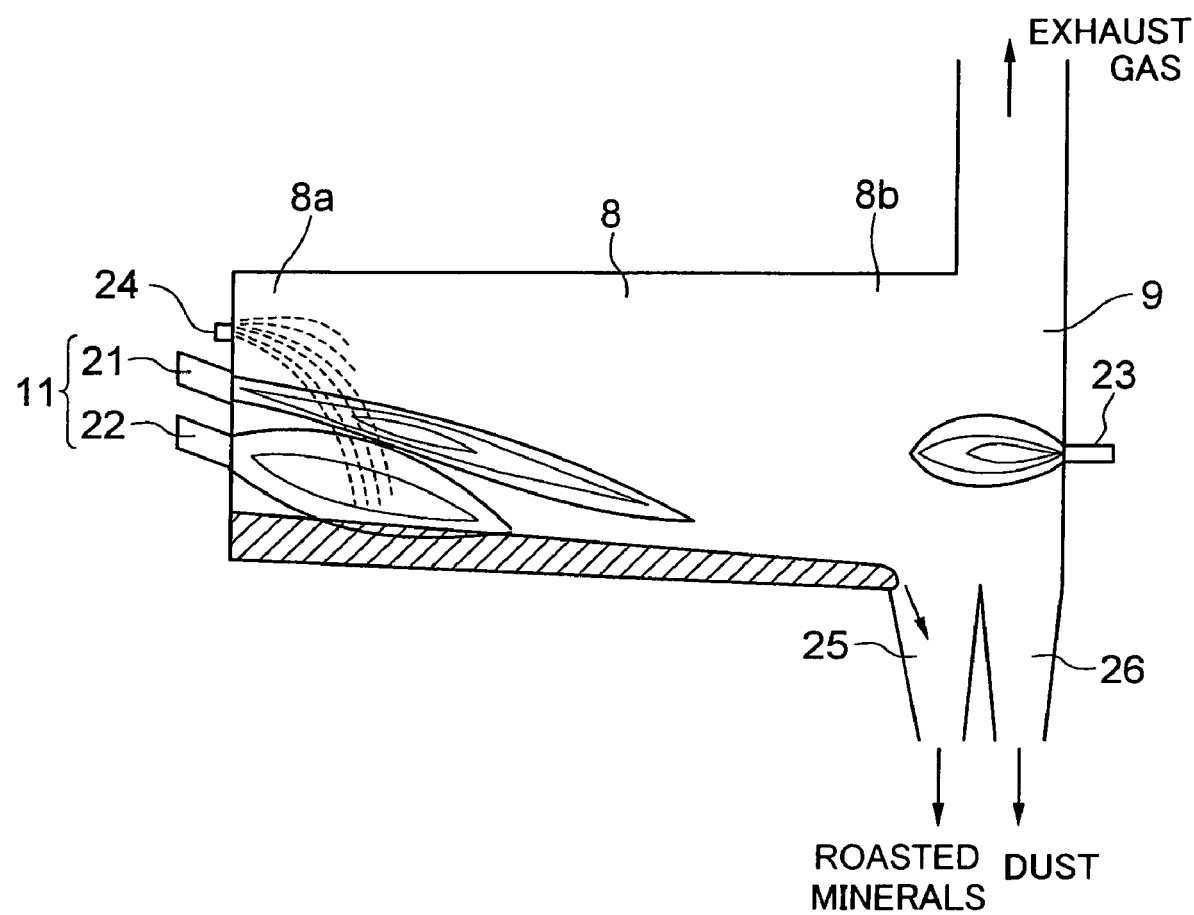
FIG. 4 is a sectional view outlining a rotary kiln according to the present invention.

FIG. 4 shows a section of the rotary kiln adopted by the present embodiment. In order to realize high temperatures on the material charge side 8a, the burner 11 is disposed on the material charge side 8a in the roasting furnace 8. However, merely disposing of the burner 11 in such a location invites a temperature decrease in the zone on the material discharge side 8b. When the S component is oxidized, heat is generated. But this heat is, in part, dissipated, which reduces the temperatures on the material discharge side 8b. Accordingly, this leads to a possibility that the oxidization reaction of the S component will come to an end.

To compensate for the heat required for the oxidization reaction of the S component, the present embodiment adopts a structure in which the burner 11 is composed of a short-flame burner 22 and a long-flame burner 21, and a counter burner 23 is attached on a side wall of the secondary combustion chamber 9. These three burners 21, 22 and 23 are controlled as to their operations in such a manner that the temperatures within the roasting furnace 8 are approximately even from the material charge side 8a to the material discharge side 8b.

Of these burners, the short-flame burner 22, which is placed to burn the C component of the material immediately after the material is charged into the furnace, raises the temperatures in the zone on the material charge side 8a. In contrast, the long-flame burner 21 emits a longer flame than that of the short-flame burner 22 and is used to raise the temperatures in the central zone in the roasting furnace 8. The counter burner 23 is attached to emit a flame of which an emitting direction is opposite to those of the long-flame and short-flame burners 21 and 22 (i.e., a direction from the material discharge side 8b to the material charge side 8a) and raises the temperatures in a zone on the material discharge side 8b in the furnace 8. In a large-size kiln, decreases in the temperatures of the furnace tail portion (that is, the material-discharge-side zone) are unavoidable even when the flame of the burner 11 is controlled to its maximum. In consideration of this fact, the counter burner 23 is adopted to control the temperatures in the furnace tail portion. In addition, floatable dust in the air, such as boiler ash, may be floated in a gas flow in the roasting furnace 8, without being burned, and may be discharged from the facility. With taking this situation into consideration as well, the counter burner 23 has a function of burning the floatable dust in the furnace tail portion. Connected to the counter burner 23 are both the fuel supply line 12 and the combustion air line 13, as shown in FIG. 1.

The structure according to the present embodiment employs a cooling water nozzle 24 linked to the front wall 10 of the roasting furnace 8. The reason for that is prevention of a local temperature upsurge within the furnace, which is attributable to a sudden burn of the material in response to invitation thereof into the furnace. Particularly, waste catalytic agents whose generation heat amounts are greater tend to provide local temperatures upsurges. The cooling water nozzle 24 is composed of a binary fluid type and is able to emit fine particle-size fluid drops serving as cooling water toward the material charge side 8a in the roasting furnace 8.

The roasted minerals, to which the roasting has been finished, are sent out from the roasting furnace 8 to the secondary combustion chamber 9, which is equipped with dichotomized-type material discharge outlets 25 and 26 for discharging the roasted minerals (material). Using these outlets 25 and 26, the roasted minerals are separated from the floatable dust. Concretely, of the outlets 25 and 26, the outlet 25 is for the roasted materials and located next to the body of the roasting furnace 8, while the outlet 26 is for the floatable dust and is located near to a side wall of the secondary combustion chamber 9 (i.e., located far from the body of the furnace). Hence the roasted minerals reach the outlet 25, and discharged through this outlet 25. On the other hand, the floatable dust is made slower in speed in the secondary combustion chamber 9, resulting in that they drop to be discharged through the outlet 26.

Since the floatable dust is carried in the gas flow, the time during which they stay in the flow in the furnace is shorter. As a result of it, the floatable dust still contains much unburnt combustible components including a high weight percentage of the S component. In contrast, experiment results reveal that the S component in the roasted minerals is less in amounts, because they can stay in the roasting furnace for a longer period of time. Thanks to the material discharge outlets 25 and 26 formed into the dichotomized outlet type, the floatable dust can be collected alone and can be charged in the furnace again. Incidentally this structure may be modified as follows. That is, employing the dichotomized type of outlets 25 and 26 is not a definitive list, but another structure may be employed, where the roasted substances to be discharged (that is, a mixture of roasted minerals and a floatable dust) are received to apply grain size separation with such a device as a cyclone separator or an airflow separator, and the separated floatable dust is charged into the roasting furnace 8 again or sent to ultimate disposal. Meanwhile, the separated coarse particle substances are charged into a heating furnace as a material for a V, Mo and Ni containing material to be used in a reduction process serving as a latter process.

Conditions for operating the rotary kiln 7 will now be described.

With the temperatures in the roasting furnace kept fixed at 800-950° C., the material is subjected to oxidizing roasting for an in-furnace retention time of two hours or more. The temperatures of 800° C. or more are required, because they are proper for removing the C component and heavy fuel oil attached to the material by oxidization thereof. In contrast, in order to prevent the recovering rate from being lowered due to sublimation of Mo, the temperatures should be equal to or less than 950° C. It is required that the in-furnace retention time be two hours or more, because both the C and S components are desired to be reduced sufficiently.

A ratio relationship (air radio) between an amount of air to be introduced into the rotary kiln 7 and an amount of air necessary for oxidizing flammable components contained in the materials is set to 1.5 to 2.5. The reason why a ratio of 1.5 or more is required is that the inside of the furnace should be over-oxygen for the sufficient oxidizing roasting of the material. However, if the ratio is excessively greater than an optimum one, the air cools down the inside of the furnace and the in-furnace temperatures will be dropped largely, thus increasing the amount of the exhaust gas. Hence the air ratio is set to 2.5 or less. The air ratio is a ratio between an amount of air to be introduced into the rotary kiln and an amount of air necessary for oxidizing flammable components in the material and a ratio of 1.0 is equivalent weight. The flammable components in the material are C, H, N and S.

Figure 5:
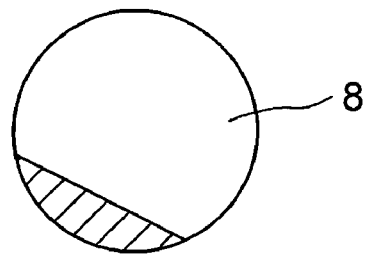
FIG. 5 is a sectional view of a roasting furnace of the rotary kiln.

As pictorially shown in FIG. 5, the roasting furnace 8 should partially be charged with the material. For example, an occupying percentage (filling degree) of the material to a cross section area of the roasting furnace 8 is 12% or less. Only the surface of the material introduced into the roasting furnace 8 is permitted to touch the air. Thus, the greater the filling degree, the smaller the specific surface area of the material, providing no sufficient touch of the material to the air. It is therefore proposed that the filling degree be set equal to or less than 12%. However, it should be avoided to give an extremely small value to the filling degree, because the production efficiency is obliged to be lessened.

It is also desired that a gas flow speed within the roasting furnace 8 be set to 3 m/s or less. Dust whose specific gravity is small, such as boiler ash, may fly to the dust collector together with the exhaust gas, without being burned out sufficiently. Thus, in order to alleviate this problem, it is desired that the gas flow speed in the furnace 8 be suppressed down to a smaller value.

How to recover valuable metals composed of V, Mo and Ni will now be described, which involves heating the roasted minerals in a heating furnace after the oxidizing roasting and reducing the heated roasted minerals with reducing agents.

Figure 6:
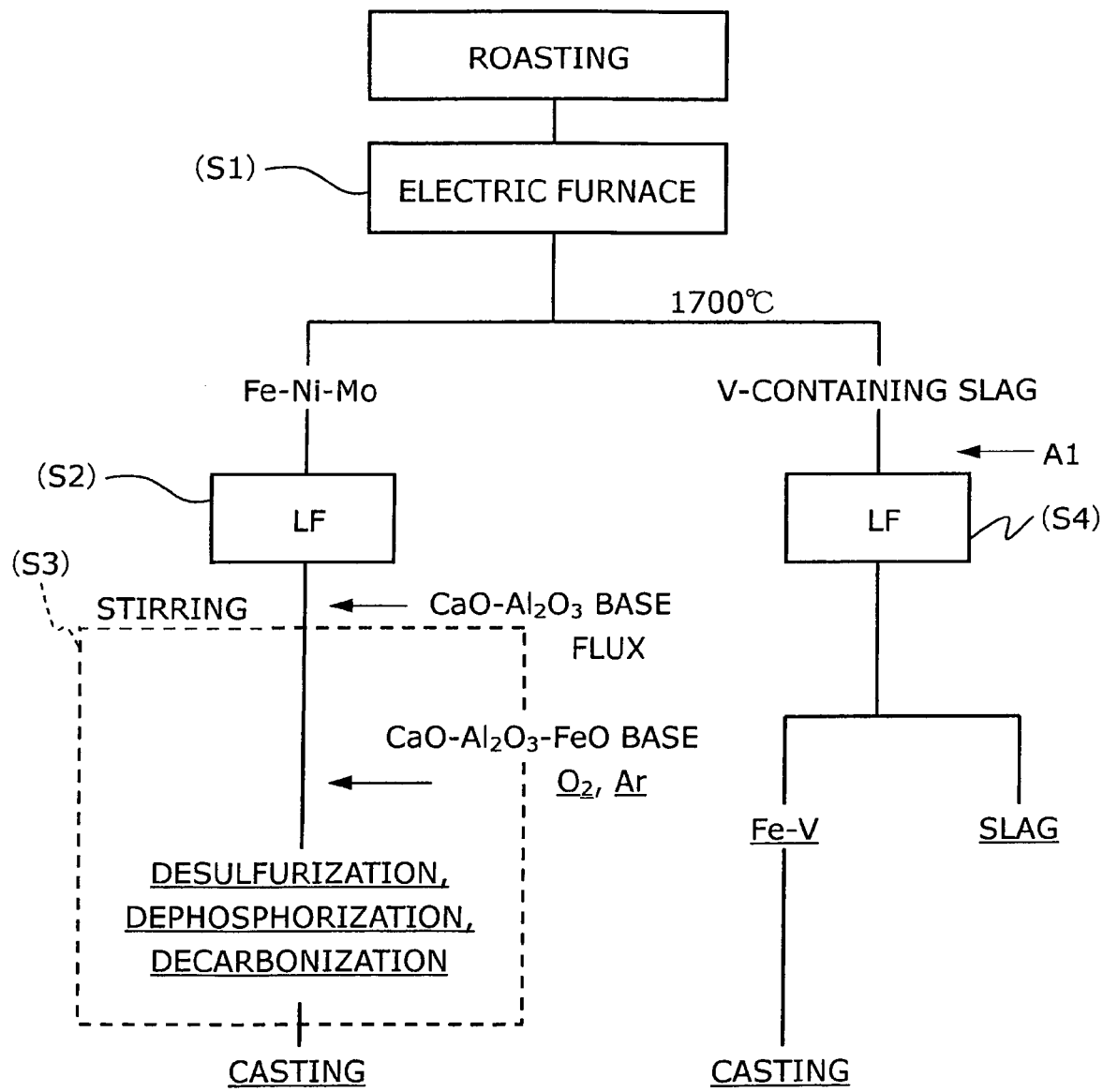
FIG. 6 is a flowchart showing how to recover valuable metals.

FIG. 6 shows a flowchart for describing how to recover valuable metals. First, the roasted metals, reducing agents, and lime serving as flux are charged into an electric furnace serving as a heating furnace (step S1). The heating and reduction in the electric furnace produces a V-containing slag and an Fe—Mo—Ni base alloy.

The Fe—Mo—Ni base alloy is separated from the V-containing slag, and then the Fe—Mo—Ni base alloy is subjected to desulfurization, dephosphorization, and decarbonization. The P component in the material remains in the Fe—Mo—Ni base alloy. Since tightened standards are applied to the S component, the desulfurization is required. Further, the decarbonization is also required, because the C component is recarbonized from electrodes. Through this process, the Fe—Mo—Ni base alloy is poured into a ladle furnace serving as a heating container (step S2). Then, the lime, CaO—Al$_2$O$_3$ base flux, and CaO—Al$_2$O$_3$—Feo base flux and others are changed into the furnace for the desulfurization, dephosphorization, and decarbonization. It is effective to use blowing an Ar gas and O$_2$ (utilizing a bubbling). However, when the oxidizing roasting process allows the decarbonization and desulfurization to be done sufficiently, these desulfurization, dephosphorization, and decarbonization processes can be omitted. Finally, the Fe—Mo—Ni base alloy that has experienced the desulfurization, dephosphorization, and decarbonization is cast into a mold.

Meanwhile, the V-containing slag is also is poured into a ladle furnace serving as a heating container (step S4). An Al-reducing agent, lime and V$_2$O$_5$ for adjusting the V component are also poured into this ladle furnace, so that a Fe-V base alloy and a Cao-Al$_2$O$_3$ slag are produced from the V-containing slag.

Table 2 exemplifies standards required for products to be finally produced.

TABLE 2

| Product name: Ferrovanadium | | | | | | | |
|---|---|---|---|---|---|---|---|
| | V (Vanadium) | C (Carbon) | Si (Silicon) | P (Phosphor) | S (Sulfur) | Al (Aluminum) | Ni (Nickel) | Mo (Molybdenum) |
| Product standard | 45.0~55.0% | 0.2% max. | 2.0% max. | 0.2% max. | 0.1% max. | 4.0% max. | 1.0% max. | 1.0% max. |

| Product name: Ferronickel molybdenum: Fe—Ni—Mo | | | | | | | |
|---|---|---|---|---|---|---|---|
| | Ni (Nickel) | Mo (Molybdenum) | C (Carbon) | Si (Silicon) | P (Phosphor) | S (Sulfur) | Cu (Cupper) | Co (Cobalt) |
| Product standard | 24.0~34.0% | 16.0~26.0% | 2.0% max. | 2.0% max. | 0.1% max. | 0.1% max. | 0.5% max. | 3.0% max. |

| Product name: Calcium aluminate: CaO—Al2O3 | | | | | | | |
|---|---|---|---|---|---|---|---|
| | Al$_2$O$_3$ (Almina) | CaO (Calcium oxide) | MgO | SiO$_2$ | FeO | P (Phosphor) | S (Sulfur) |
| Product standard | 50.0~55.0% | 28.0~33.0% | 10.0% max. | 5.0% max. | 1.0% max. | 0.05% max. | 0.1% max. |

The Fe—V base alloy is required to have standards that correspond to, for example, JIS No. 2 standardized articles. According to these standards, the V component is required to be adjusted to 45-55 mass %, C, Si, P, S and other components are lowered and Ni, Mo and Al components are lowered as well. As to the Fe—Ni—Mo basis alloy, the standards used in the field of steel can be used, for instance. It is therefore necessary that the P and S components are lowered according to those standards. In addition, the S value of calcium aluminate is required to be lowered.

Embodiment

As raw materials to be processed, a direct desulfurization catalyst, indirect desulfurization catalyst, boiler ash, boiler sludge, and nickel component were mixed at a service ratio shown in Table 3. A percent composition of those mixed materials is shown in Table 4.

TABLE 3

| Material name | Service ratio (%) |
|---|---|
| Direct desulfurization catalyst | 35 |
| Indirect desulfurization catalyst | 6 |
| Boiler ash | 33 |
| Boiler sludge | 25 |
| Nickel component | 1 |
| Mixed material alloy | 100 |

TABLE 4

| (Mixed material alloy) | | | | | | |
|---|---|---|---|---|---|---|
| Mo | Ni | V | P | S | C | (%) Al$_2$O$_3$ |
| 1.04 | 1.7 | 4.63 | 0.14 | 9.15 | 46.8 | 15.1 |

Figure 7:
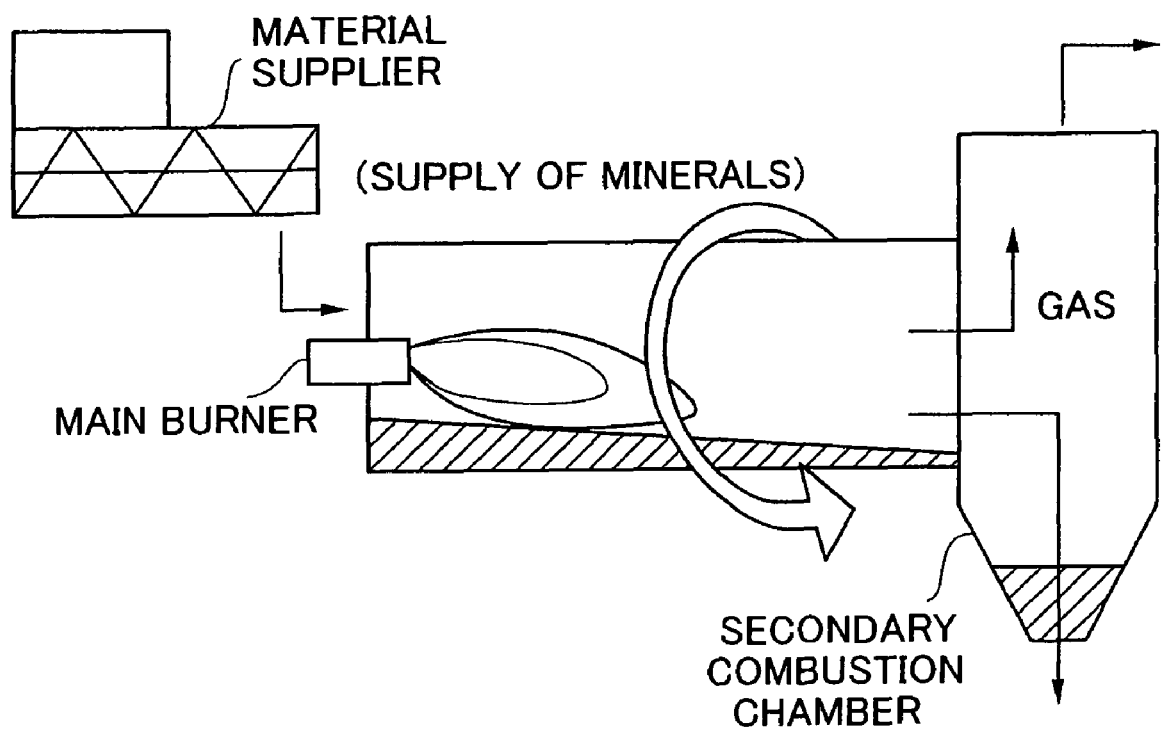
FIG. 7 is a sectional view of the rotary kiln according to an embodiment.

The mixed raw materials were then subjected to a roasting test in a rotary kiln. The rotary kiln which was used is a continuous type rotary kiln shown in FIG. 7.

Under conditions of a temperature of 900° C., in-furnace occupying percentage (i.e., filling degree) of 12%, an in-furnace retention time (i.e., process time) of 3 hrs, and an air ratio of 2, the rotary kiln were operated. As a result of it, as shown in Table 5, the after-processed C and S components were lowered down to 0.1% or less. As shown in Table 6, a yield ratio of 95% or more for the roasted minerals was also secured.

TABLE 5

C and S values

|  | C | S |
|---|---|---|
|  | (%) | (%) |
| Before processing | 46.8 | 9.15 |
| After processing | 0.04 | 0.09 |

TABLE 6

Balance of Mo, Ni and V

|  | Mo | Ni | V |
|---|---|---|---|
|  | (%) | | |
| Calcinated mineral | 95 | 97 | 97 |
| Others (scattering components etc) | 5 | 3 | 3 |

Then, with the operating conditions changed, another roasting test was carried out, in which, specifically, the in-furnace filling degree, in-furnace process time, and temperature were changed at every amount of the materials to be charged in order to measure the C, S and Mo components of the materials to be processed. Table 7 shows the results on those tests.

TABLE 7

| Amount to be charged (kg) | Time (hr) | Filling factor (%) | Temperature (° C.) | Air ratio | C (%) | S (%) | Mo (%) |
|---|---|---|---|---|---|---|---|
| 100 | 1 | 17.1 | 900 | 2 | 17.80 | 8.50 | 2.43 |
|  | 2 |  |  |  | 3.40 | 4.50 | 2.51 |
|  | 3 |  |  |  | 0.45 | 1.02 | 2.30 |
| 70 | 1 | 12.0 | 900 | 2 | 12.40 | 6.90 | 2.29 |
|  | 2 |  |  |  | 0.17 | 0.50 | 2.47 |
|  | 3 |  |  |  | 0.04 | 0.09 | 2.31 |
| 55 | 1 | 9.4 | 900 | 2 | 3.40 | 7.90 | 2.30 |
|  | 2 |  |  |  | 0.04 | 0.41 | 2.25 |
|  | 3 |  |  |  | 0.01 | 0.03 | 2.29 |
| 35 | 1 | 6.0 | 900 | 2 | 1.00 | 5.80 | 2.29 |
|  | 2 |  |  |  | 0.02 | 0.19 | 2.20 |
|  | 3 |  |  |  | 0.01 | 0.01 | 2.11 |
| 35 | 1 | 6.0 | 800 | 2 | 4.80 | 6.40 | 6.40 |
|  | 2 |  |  |  | 0.68 | 2.60 | 2.34 |
|  | 3 |  |  |  | 0.02 | 0.30 | 2.45 |

During the processing, the removal of the S component (i.e., oxidizing roasting of sulphirde) will start after completion of combustion of the C component. Hence an interval of time necessary for the process amounts to "a time necessary for combustion of the C component"+"a time necessary for removing the S component". When the percentage of the S component is lowered, that of the C component is also lowered. The tested results in terms of the percent composition of the S component can be estimated as shown in Table 8.

TABLE 8

| Amount to be charged (kg) | Occupying percentage of initial section (%) | Convection time (h) | | | |
|---|---|---|---|---|---|
|  |  | 1 | 2 | 2.5 | 3 |
| 35 | 6.0 | x | Δ | ○ | ○ |
| 55 | 9.4 | x | Δ | ○ | ○ |
| 70 | 12.0 | x | Δ | ○ | ○ |
| 100 | 17.1 | x | x | x | x |

▓ : favorable conditions
○: <0.1% S
Δ: ≤0.5% S
x: >0.5% S

From Table 8, for further reducing the percent composition of the S component, it is understood that it is desired to set not only the in-furnace process time to 2 hours or more but also the filling degree to 12% or less.

This application is based on the Japanese Patent application No. 2005-292397 filed on Oct. 5, 2005, entire content of which is expressly incorporated by reference herein.

What is claimed is:

1. A method of roasting a material containing at least one of V, Mo and Ni to remove C and S components from the material comprising oxidizing and roasting the material in a rotary kiln, before reducing the material by means of a reducing agent so as to recover valuable metals comprising at least one of V, Mo and Ni, the method comprising steps of:
    charging the material containing the C and S components into a material charge side of a roasting furnace on which a burner is disposed; and
    feeding an oxygen-containing gas into the roasting furnace to become parallel to a direction along which the material moves in the roasting furnace,
    wherein the burner comprises a short-flame burner for raising temperatures in a zone located on the material charge side in the roasting furnace and a long-flame burner for raising temperatures in a central zone of the roasting furnace and
    the rotary kiln is equipped with a counter burner for raising temperatures in a zone on a material discharge side in the roasting furnace.

2. The method of claim 1, wherein the oxygen-containing gas is air,
    an air ratio between an amount of air taken into the rotary kiln and an amount of air necessary for complete combustion of a flammable component contained in the material is set to 1.5 to 2.5.

3. The method of claim 1, wherein an occupying percentage (filling degree) of the material to a sectional area of the roasting furnace is equal to or less than 12%.

4. The method of claim 1, wherein a speed of the flow of the gas is 3 m/sec or less.

5. The method of claim 1, wherein the rotary kiln is equipped with a dichotomized-type material discharge outlet at which the material is separated into a roasted mineral and a floatable dust.

6. The method of claim 1, wherein the material discharged from a material discharge outlet of the rotary kiln is screened in particle sizes thereof to produce both coarse particle substances and fine particle substances; the coarse particle substances are then charged as a material into a heating furnace in a reduction process of reducing of the material by means of the reducing agent; and the fine particle substances are then subjected to processing which is either charging into the rotary kiln again as the material to be processed for the roasting or ultimate disposal.

7. The method of claim 1, wherein the material is oxidized and roasted at an in-furnace temperature of 800° C. to 950° C. inclusive and an in-furnace retention time of 2 hours or more.

8. The method of claim 7,
wherein a cooling water nozzle is provided on the material charge side of the roasting furnace so as to spray water inside the roasting furnace.

9. The method of claim 1,
wherein a cooling water nozzle is provided on the material charge side of the roasting furnace so as to spray water inside the roasting furnace.

10. A method of roasting a material containing at least one of V, Mo and Ni to remove C and S components from the material comprising oxidizing and roasting the material in a rotary kiln, before reducing the material by means of a reducing agent so as to recover valuable metals comprising at least one of V, Mo and Ni, the method comprising the steps of:
charging the material containing the C and S components into a material charge side of a roasting furnace on which a burner is disposed; and
feeding an oxygen-containing gas into the roasting furnace to become parallel to a direction along which the material moves in the roasting furnace,
wherein a cooling water nozzle is provided on the material charge side of the roasting furnace so as to spray water inside the roasting furnace.

11. The method of claim 10, wherein the material is oxidized and roasted at an in-furnace temperature of 800° C. to 950° C. inclusive and an in-furnace retention time of 2 hours or more.

12. The method of claim 10, wherein the oxygen-containing gas is air,
an air ratio between an amount of air taken into the rotary kiln and an amount of air necessary for complete combustion of a flammable component contained in the material is set to 1.5 to 2.5.

13. The method of claim 10, wherein an occupying percentage (filling degree) of the material to a sectional area of the roasting furnace is equal to or less than 12%.

14. The method of claim 10, wherein a speed of the flow of the gas is 3 m/sec or less.

15. The method of claim 10, wherein the rotary kiln is equipped with a dichotomized-type material discharge outlet at which the material is separated into a roasted mineral and a floatable dust.

16. The method of claim 10, wherein the material discharged from a material discharge outlet of the rotary kiln is screened in particle sizes thereof to produce both coarse particle substances and fine particle substances; the coarse particle substances are then charged as a material into a heating furnace in a reduction process of reducing of the material by means of the reducing agent; and the fine particle substances are then subjected to processing which is either charging into the rotary kiln again as the material to be processed for the roasting or ultimate disposal.

* * * * *